United States Patent Office

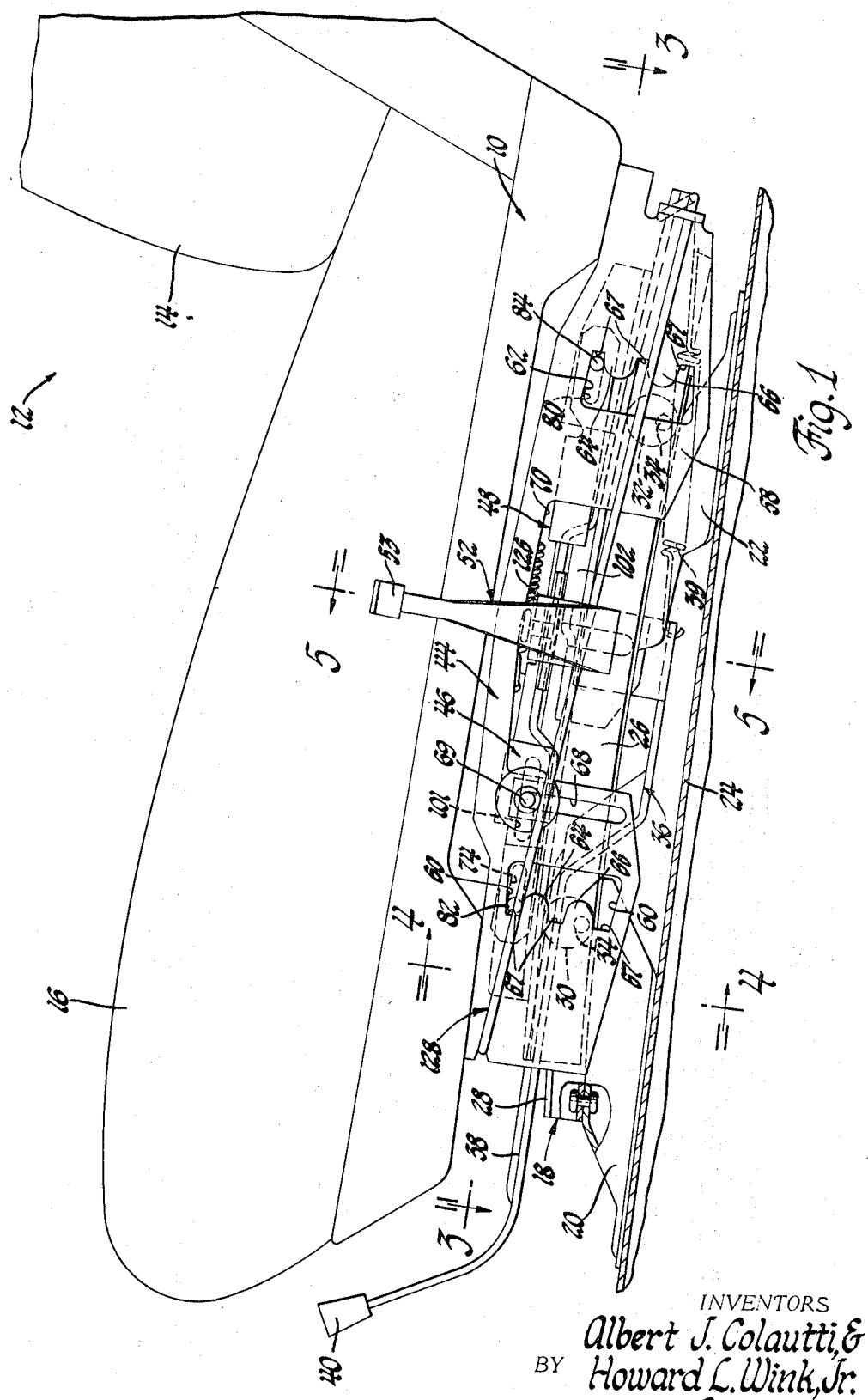

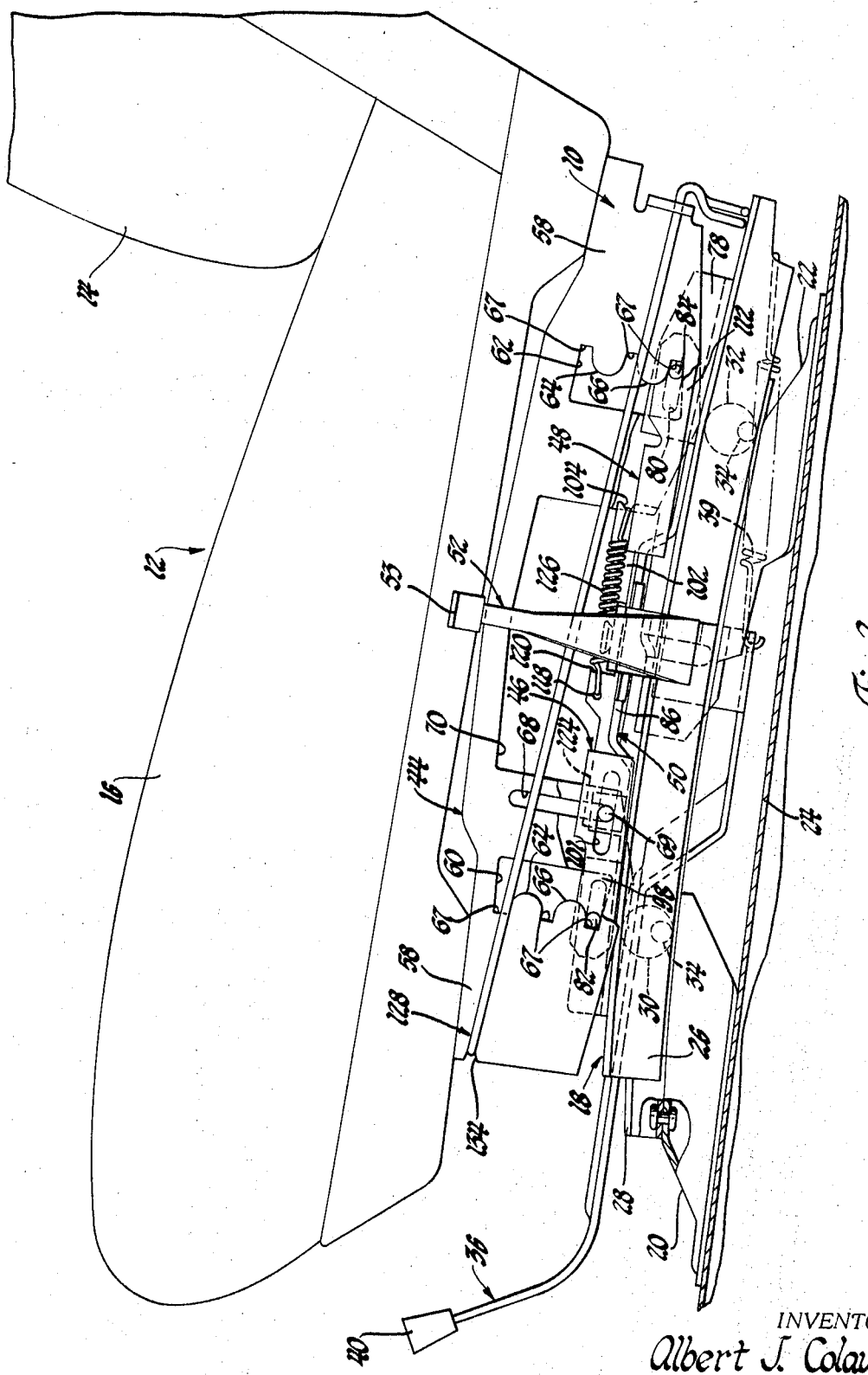

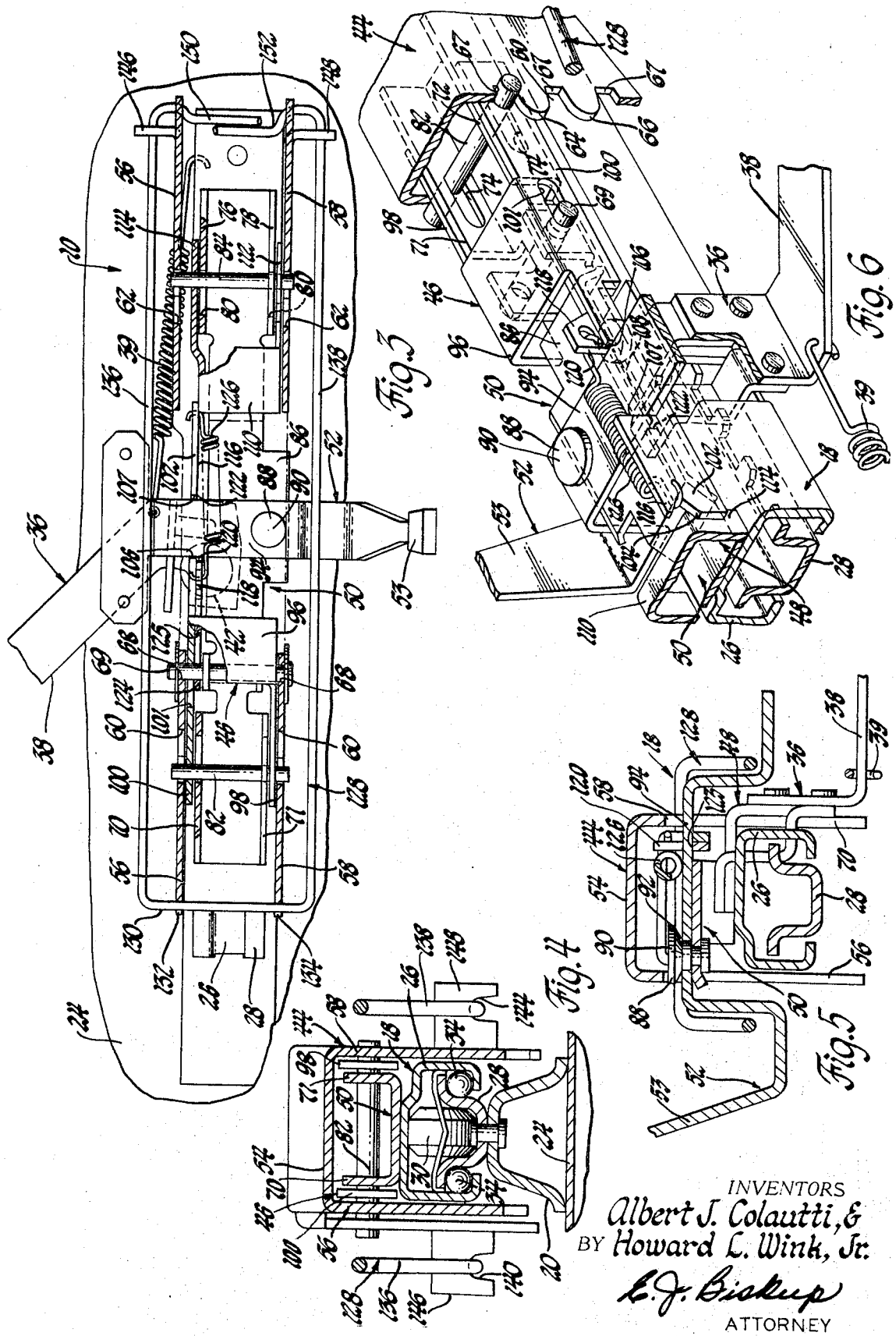

3,525,496
Patented Aug. 25, 1970

1

3,525,496
MANUALLY OPERABLE SEAT ADJUSTER MECHANISM
Albert J. Colautti, Windsor, Ontario, Canada, and Howard L. Wink, Jr., Troy, Mich., assignors to General Motors Corporation, Detroit, Mich., a corporation of Delaware
Filed Nov. 25, 1968, Ser. No. 778,396
Int. Cl. B60n 3/06
U.S. Cl. 248—394     6 Claims

ABSTRACT OF THE DISCLOSURE

A manually operable vehicle seat adjuster mechanism for raising and lowering the forward end and the rearward end of a seat about first and second longitudinally spaced axes extending transversely of the vehicle. The mechanism is characterized by having a pair of locking pins, one of which is located adjacent the front end of the seat along the first transverse axis, while the other is located adjacent the rear of the seat along the second transverse axis. Both locking pins are selectively and independently movable along the longitudinal axis of the vehicle out of engagement with one of a plurality of vertically spaced notches so as to permit height adjustment of either the front or rear end of the seat.

The present invention is concerned with a seat adjusting device of the type utilized for varying the elevation of both the front end and the rear end of a vehicle seat. In the preferred form, the seat adjusting device made in accordance with the invention includes a plate member which is secured to the underside of the seat and lies in a substantially vertical plane extending longitudinally of the vehicle. A plurality of vertically spaced notches are formed in the plate member adjacent the forward end and the rearward end of the seat. A support member is attached to the floor and carries a locking mechanism which includes a pair of locking members supported for independent relative sliding movement along the longitudinal axis of the vehicle. Each of the locking members has a raised shoulder and a locking pin, and the arrangement is such that the locking pins are longitudinally spaced and located along first and second horizontal axes extending transversely of the vehicle. One of the locking members has the locking pin thereof cooperating with the notches formed adjacent the front end of the seat, while the other of the locking members has the associated locking pin cooperating with the notches formed adjacent the rear of the seat. A spring is provided for interconnecting the locking members and continuously urging the locking pins into engagement with the notches formed in the plate member. A hand-operated lever is movable forwardly or rearwardly for selectively engaging one of the locking members for retracting the associated locking pin from the notch and permitting vertical movement of the seat about the axis extending through the other locking pin.

The objects of the present invention are to provide a seat adjuster mechanism of relatively simple design which permits the front end and rear end of a seat to be varied in height; to provide a seat adjuster mechanism having an operating handle which is normally locked in position and adjustment of the seat is realized only after first depressing the handle followed by either forward or rearward pivotal movement of the operating handle; to provide a mechanism which supports a vehicle seat and permits the latter to have the front end or the rear end thereof to be raised or lowered to varying positions so as to accommodate vehicle operators of different stature; to provide a vehicle seat adjuster having locking pins which are spaced along an axis extending longitudinally of the

2 vehicle and serve as pivot points about which the front end and the rear end of the seat are movable; and to provide a seat adjuster device which serves to raise or lower either the front end or the rear end of a vehicle seat and can be combined with a track assembly which provides for fore and aft movement of the seat.

Further objects and advantages of the present invention will be derived from the following detailed description when taken with the drawings in which:

FIG. 1 is a side elevational view showing a seat adjuster mechanism made in accordance with the invention and incorporated with a vehicle seat;

FIG. 2 is a view similar to FIG. 1 but shows the parts of the adjuster mechanism located in positions assumed when the front and rear of the seat are in the fully raised position;

FIG. 3 is a plan view of the adjuster mechanism with certain parts broken away and taken on line 3—3 of FIG. 1;

FIG. 4 is an enlarged sectional view taken on line 4—4 of FIG. 1;

FIG. 5 is an enlarged sectional view taken on line 5—5 of FIG. 1, and

FIG. 6 is a perspective view showing in detail the construction of the actuating lever and the locking members associated with the adjusting device of FIGS. 1 through 5.

Referring to the drawings and more particularly FIG. 1 thereof, a seat adjuster mechanism generally indicated by the numeral 10 is shown supporting a vehicle seat 12 comprising the usual seat back 14 and seat cushion 16. The seat adjuster mechanism 10 is located along the outboard side of the seat 12 and provides for vertical adjustment of the front end and the rear end of the seat 12 in a manner to be more fully described hereinafter. The seat 12 is carried by a track assembly 18 which provides for fore and aft movement of the vehicle seat 12. The track assembly 18 is rigidly secured by a front support bracket 20 and a rear support bracket 22 to a vehicle floor 24 and, as seen in FIGS. 4 and 5, comprises the usual upper and lower interlocked channel members 26 and 28, respectively, having the conventional pair of axially spaced roller bearing 30 and 32 for supporting vertical loading and ball bearings 34 for facilitating relative sliding movement of the channel members when the seat 12 is being adjusted in the fore or aft direction. As seen in FIG. 3, a lock member 36 is pivotally mounted to the upper channel member 26 and has a lever 38 which is normally urged toward the locked position by a spring 39 and extends forwardly and terminates with a handle 40 located midway between the laterally spaced sides of the seat cushion 16. Track assemblies of this type are well known to those skilled in the art and it will be understood that by moving the handle 40 toward the viewer, as seen in FIG. 1, the lock member 36 will pivot counterclockwise about its pivotal connection 42, as viewed in FIG. 3, to release the upper channel member 26 relative to the lower channel member 28 and allow forwardly or rearwardly adjustable movement of the vehicle seat 12.

At this point in the description of the invention, it will be noted that although only one adjuster mechanism 10 is shown in the drawings, it will be understood that a similar device is located on the inboard side of the vehicle seat 12 and includes parts identical to those to be described for providing adjustment of the seat 12.

The seat adjuster mechanism 10 made according to the invention comprises a plate member 44 rigidly attached to the underside of the seat cushion 16, a pair of locking members 46 and 48 carried by a support member 50 rigid with the track assembly 18, and an operating lever 52 including handle 53 located between the locking members 46 and 48 and pivotally mounted on the support member 50.

More specifically, the plate member 44 is U-shaped in cross section and, as seen in FIGS. 4 and 5, comprises a base section 54 integrally formed at the front end and the rear end with a pair of laterally spaced and downwardly extending arms 56 and 58. Each arm 56 and 58 of the forward end of the plate member 44 is formed with an inverted E-shaped slot 60. As seen in FIG. 3, the slots 60 are identical in shape and transversely aligned. Similarly, each arm 56 and 58 of the rear portion of the plate member 44 is formed with an E-shaped slot 62. The slots 62 are also identical in configuration and transversely aligned as seen in FIG. 3. As best seen in FIG. 2, each of the E-shaped slots 60 and 62 includes substantially horizontally extending projections 64 and 66, the ends of which are curved for purposes which will become clear as the description of the invention proceeds. The projections 64 and 66 serve to define three substantially vertically aligned notches 67 which are provided for cooperation with the locking members 46 and 48 for locating the seat 12 at a desired height. It will be noted that the front arms 56 and 58 of the plate member 44 are provided with transversely aligned vertically extending guide slots 68 which accommodate a cylindrical pin 69 fixed with the support member 50. Thus, the plate member's vertical movement is in part guided relative to the support member 50 during vertical adjustment of the seat 12. It will also be noted that an intermediate portion of the plate member 44 is provided with an inverted U-shaped cutout 70 which permits the plate member 44 to clear parts of the adjuster mechanism carried by the support member 50.

The support member 50 is a sheet metal stamping, the forward end of which has laterally spaced and upwardly extending ears 71 and 72 formed with transversely aligned elongated slots 74, the major axis of which extends in a substantially horizontal direction. The rear end of the support member 50 is also formed with laterally spaced ears 76 and 78 which are provided with transversely aligned elongated slots 80, each also having the major axis extending substantially horizontally. The slots 74 and 80 serve to accommodate the outer ends of cylindrical locking pins 82 and 84 rigidly secured to the locking members 46 and 48, respectively.

An intermediate portion 86 of the support member 50 is raised, as seen in FIG. 2, and supports the operating lever 52 for pivotal movement about an upstanding axis provided by the pin 88. As seen in FIG. 5, the pin 88 has a raised head 90 with an inwardly tapering portion 92 immediately above the operating lever 52. Thus, for reasons to be explained hereinafter, the pin 88 serves as a universal connection permitting the operating lever 52 to be depressed downwardly at its outward end and cause upward movement of a section 94 overlying the locking members 46 and 48. Also, the operating lever 52 can be rotated in a horizontal plane forwardly or rearwardly about the pivot pin 88.

Referring to FIGS. 2, 3 and 4, the locking member 46 comprises a base section 96 which is integrally formed with downwardly extending legs 98 and 100. The locking pin 82 is press fitted within the ends of the legs 98 and 100 so as to be substantially rigid therewith. The legs 98 and 100 are provided with elongated substantially horizontally extending slots 101 through which the pin 69 fixed to the support member 50 extends. The pin 69 together with the locking pin 82 therefore cooperate with the slots 60 and 101, respectively, to allow sliding movement of the locking member 46 in a substantially horizontal plane along an axis parallel to the longitudinal axis of the vehicle. Moreover, the leg 100 is formed integrally with an elongated tongue 102 that extends rearwardly and lies in the same vertical plane and terminates with a V-shaped groove 104. As seen in FIG. 6, the tongue 102 has a shoulder 106 which is normally positioned adjacent to the flat section 94 of the operating lever 52 and also includes a seating surface 108 for accommodating the section 94.

The locking member 48 is similar in form to the locking member 46 in that it has a base section 110 which is integrally connected with laterally spaced downwardly depending legs 112 and 114, the rear ends of which rigidly support the locking pin 84. A tongue 116 is integral with the leg 114 and extends forwardly and has an upstanding eye portion 118 formed thereon. The eye portion 118 has spaced shoulders 120 and 122 and also includes a horizontal surface 123 which serves to accommodate the section 94 of the operating lever 52. As seen in FIG. 3, the tongue 116 terminates with a guide section 124 having an elongated slot 125 formed therein through which the pin 69 extends. Thus, as seen in FIG. 6, the locking members 46 and 48, by virtue of the associated tongues, have a portion of each located on both sides of the operating lever 52 with a spring 126 interconnecting the two members by having one end mounted in the eye portion 118 and the other end located within the groove 104. As should be apparent, the spring serves to bias the locking members 46 and 48 along a longitudinal axis in directions which cause the locking pins 69 and 84 to move into engagement with one of the notches 67 formed in the slots of the plate member. It will also be noted that as seen in FIGS. 1 and 3, a generally U-shaped spring 128 has the base section 130 thereof seated within notches 132 and 134 formed in the arms 56 and 58 of the plate member 44, while the rear ends of the spring legs 136 and 138 are seated within notches 140 and 144, respectively, formed in outwardly extending tabs 146 and 148 which are rigidly secured to the rear end of the plate member 44. The free ends of the respective spring legs 136 and 138 terminate with inwardly extending torsion arms 150 and 152 which rest upon the upper surface of the channel member 26 and normally exert a downward biasing force thereon. The spring 128 serves as a counterbalance means for continuously urging the rear end of the plate member 44 and, accordingly, the seat 12 in an upward direction to facilitate vertical adjustment of the rear end of the seat.

The operation of the seat adjuster mechanism described above is as follows. Assuming the seat 12 is in the fully lowered position, as seen in FIG. 1, and it is desired to have the front end of the seat raised upwardly, the seat occupant will initially grasp the handle 53 of the operating lever 52 and depress it downwardly so as to permit the section 94 to clear the shoulder 122 formed with the tongue 116. Thereafter, the handle 53 is moved forwardly or clockwise about the pivot pin 88 causing the operating lever 52 and the section 94 to engage the shoulder 107 formed with the tongue 102. As a result, the locking member 46 is moved to the right as seen in FIGS 1 and 3, causing the locking pin 82 to be retracted from the uppermost notch 67. The seat occupant then merely leans back in the seat 12 so as to assert a rearward force on the seat back 14 and permit the front end of the seat 12 to rise to one of the two positions provided by the other two notches 67. When the handle 53 is released, the spring 126 will return the operating lever 52 to its normal locked position shown in FIG. 1 by urging the section 94 downwardly and will also cause the locking pin 82 to move into the appropriate notch 67 so as to lock the front end of the seat 12 in position. At this juncture, it will be noted that as the front of the seat is moved upwardly during adjustment, the locking pin 84 serves as a point about which the seat pivots. Moreover, the guide slot 68 maintains the various components of the seat adjuster in proper relationship during such movement.

In order to raise the rear end of the seat 12, the handle 53 will again be depressed downwardly initially permitting the section 94 to clear the shoulder 106. Thereafter, the handle 53 is moved in a horizontal plane about the pivot pin 88 in a counterclockwise direction, as seen in FIG. 3, causing the section 94 to engage the shoulder 120 so as to move the locking member 48 forwardly or to the left as seen in FIG. 1. The seat occupant then shifts his weight forwardly and with the aid of the U-shaped spring 128 the rear end of the seat 12 moves upwardly until the handle 53 is released at which time the spring 126 returns the locking member 48 to its normal position and causes the locking pin 84 to move into a notch 67 to lock the seat 12 in position.

As aforementioned, fore and aft adjustment of the seat 12 is provided by the track assembly 18 and is realized by moving the handle 40 attached to the lever 38 so that lock member 36 will pivot counterclockwise about the pivotal connection 42 and release the upper channel member 26 from the lower channel member 28. Thus, it should be apparent that the combined device described above permits the seat 12 to have six modes of adjustment in that the seat is movable forwardly or rearwardly through the track assembly 18 and has the front portion and rear portion of the seat 12 movable upwardly or rearwardly through the seat adjuster mechanism 10 made in accordance with the invention.

Various changes and modifications can be made in this construction without departing from the spirit of the invention. Such changes and modifications are contemplated by the inventors and they do not wish to be limited except by the scope of the appended claims.

We claim:

1. The combination with a vehicle having a seat and a floor, a manually operable seat adjuster for selectively raising and lowering the forward end and rear end of said seat relative to said floor, said seat adjuster comprising a plate member secured to the underside of said seat and lying in a substantially vertical plane extending longitudinally of said vehicle, a plurality of vertically spaced notches formed in said plate member adjacent the forward end and rearward end of said seat, a support member attached to said floor, a locking mechanism carried by said support member and comprising a pair of locking members supported for independent relative sliding movement along the longitudinal axis of the vehicle, each of said locking members having a cylindrical locking pin rigidly connected thereto, the locking pins associated with said locking members being engageable with said notches at the forward end and rearward end of said seat to lock said seat in position, spring means urging the locking pins into engagement with the associated notches formed in the plate member, and a hand-operated lever supported by said support member for pivotal movement and adapted to engage one of said locking members upon pivotal movement of said lever in one direction to retract the associated locking pin from the notch and permit vertical movement of the seat about the locking pin associated with the other of said locking members.

2. The combination with a vehicle having a seat and a floor, a manually operable seat adjuster for selectively raising and lowering the forward end and rear end of said seat relative to said floor, said seat adjuster comprising a plate member secured to the underside of said seat and lying in a substantially vertical plane extending longitudinally of said vehicle, a plurality of vertically spaced notches formed in said plate member adjacent the forward end and rearward end of said seat, a support member attached to said floor, a locking mechanism carried by said support member and comprising a pair of locking members supported for independent relative sliding movement along the longitudinal axis of the vehicle, each of said locking members having a cylindrical locking pin rigidly connected thereto, the locking pins associated with said locking members being engageable with said notches at the forward end and rearward end of said seat to lock said seat in position, a spring interconnecting said locking members and urging the locking pins into engagement with the associated notches formed in the plate member, and a hand-operated lever supported by said support member for pivotal movement about a substantially vertical axis, said hand-operated lever adapted to engage one of said locking members upon pivotal movement of said lever in one direction about said substantially vertical axis to retract the associated locking pin from the notch and permit vertical movement of the seat about the locking pin associated with the other of said locking members.

3. The combination with a vehicle having a seat and a floor, a manually operable seat adjuster for selectively raising and lowering the forward end and rear end of said seat relative to said floor about first and second longitudinally spaced and substantially parallel horizontal axes extending transversely of said vehicle, said seat adjuster comprising a plate member secured to the underside of said seat and lying in a substantially vertical plane extending longitudinally of said vehicle, a plurality of vertically spaced notches formed in said plate member adjacent the forward end and rearward end of said seat, a support member attached to said floor, a locking mechanism carried by said support member and comprising a pair of locking members supported for independent relative sliding movement along the longitudinal axis of the vehicle, each of said locking members having a raised shoulder and a cylindrical locking pin rigidly connected thereto, the locking pins associated with said locking members being located along said first and second axes and engageable with said notches at the forward end and rearward end of said seat, a spring interconnecting said locking members and urging the locking pins into engagement with the associated notches formed in the plate member, and a hand-operated lever supported by said support member between said locking members for pivotal movement about a substantially vertical axis and a substantially horizontal axis, said hand-operated lever adapted to engage the shoulder of said one of said locking members upon pivotal movement of said lever in one direction to retract the associated locking pin from the notch and permit vertical movement of the seat about the locking pin associated with the other of said locking members.

4. The combination set forth in claim 3 wherein said locking members are provided with means for holding the hand-operated lever from pivotal movement about the substantially vertical axis until said hand-operated lever is first moved about the substantially horizontal axis.

5. The combination set forth in claim 4 wherein said spring cooperates with said means for holding said hand-operated lever from pivotal movement about the substantially vertical axis.

6. The combination with a vehicle having a seat and a floor, a manually operable seat adjuster for moving the forward end and rear end of said seat relative to said floor about first and second longitudinally spaced and substantially parallel horizontal axes extending transversely of said vehicle, a track assembly located between said seat adjuster and said floor for adjustably positioning the seat along a substantially horizontal plane, said seat adjuster comprising a plate member secured to the underside of said seat and lying in a substantially vertical plane extending longitudinally of said vehicle, a plurality of vertically spaced notches formed in said plate member adjacent the forward end and rearward end of said seat, a support member attached to said track assembly, a locking mechanism carried by said support member and comprising a pair of locking members supported for independent relative sliding movement along the longitudinal axis of the vehicle, each of said locking members having a raised shoulder and a cylindrical locking pin rigidly connected thereto, the locking pins associated with said locking members being located along said first and second axes and engageable with said notches at the forward end and rearward end of said seat, a spring interconnecting said locking members and urging the locking pins into engagement with the associated notches formed in the plate member, and a hand-operated lever supported by said support member between said locking members for pivotal movement about a substantially vertical axis and a substantially horizontal axis, said hand-operated lever adapted to be initially moved about said substantially horizontal axis and engage the shoulder of said one of said locking members whereupon pivotal movement of said lever about said substantially vertical axis in one direction causes the associated locking pin to be retracted from the notch and thereby permit vertical movement of the seat about the locking pin associated with the other of said locking members.

References Cited

UNITED STATES PATENTS

| | | | |
|---|---|---|---|
| 1,855,219 | 4/1932 | Brownell | 248—396 |
| 2,134,135 | 10/1938 | Lefevre | 248—396 |
| 2,795,267 | 6/1957 | Williams | 248—394 |
| 3,147,945 | 9/1964 | Leslie | 248—394 |
| 3,335,995 | 8/1967 | Pickles | 248—394 |

FOREIGN PATENTS

| | | |
|---|---|---|
| 649,595 | 11/1962 | Italy. |

REINALDO P. MACHADO, Primary Examiner